United States Patent [19]

Boden

[11] 3,845,575
[45] Nov. 5, 1974

[54] CORD LOCKING ASSEMBLY

[76] Inventor: Ogden W. Boden, 1580 Gaywood Dr., Altadena, Calif. 91001

[22] Filed: May 7, 1973

[21] Appl. No.: 357,851

[52] U.S. Cl.............. 36/50, 24/115 R, 24/117 A, 24/136 R, 403/211
[51] Int. Cl....................... A43b 11/00, F16g 11/04
[58] Field of Search .......... 24/115 H, 115 F, 115 G, 24/115 R, 117 A, 117 R, 118, 136 R, 136 B, 136 L; 36/50; 403/211, 374

[56] References Cited
UNITED STATES PATENTS

| | | | |
|---|---|---|---|
| 2,200,895 | 5/1940 | Rio | 24/117 |
| 2,318,411 | 5/1943 | Moore | 24/117 R |
| 3,132,390 | 5/1964 | Boden | 24/117 R |
| 3,138,839 | 6/1964 | Mathes | 24/117 R |

Primary Examiner—Paul R. Gilliam
Assistant Examiner—Kenneth J. Dorner
Attorney, Agent, or Firm—William P. Green

[57] ABSTRACT

An assembly including two cords or cord ends which pass through and are adjustably retained by a cord locking device, and have ends beyond said device which are held by the device in the form of two loops. The device has laterally extending grooves formed at one end thereof and through which the two cords extend laterally in a relation tending to hold the device in a desired generally parallel relation with respect to an adjacent structure when the cords are tightened in use.

9 Claims, 7 Drawing Figures

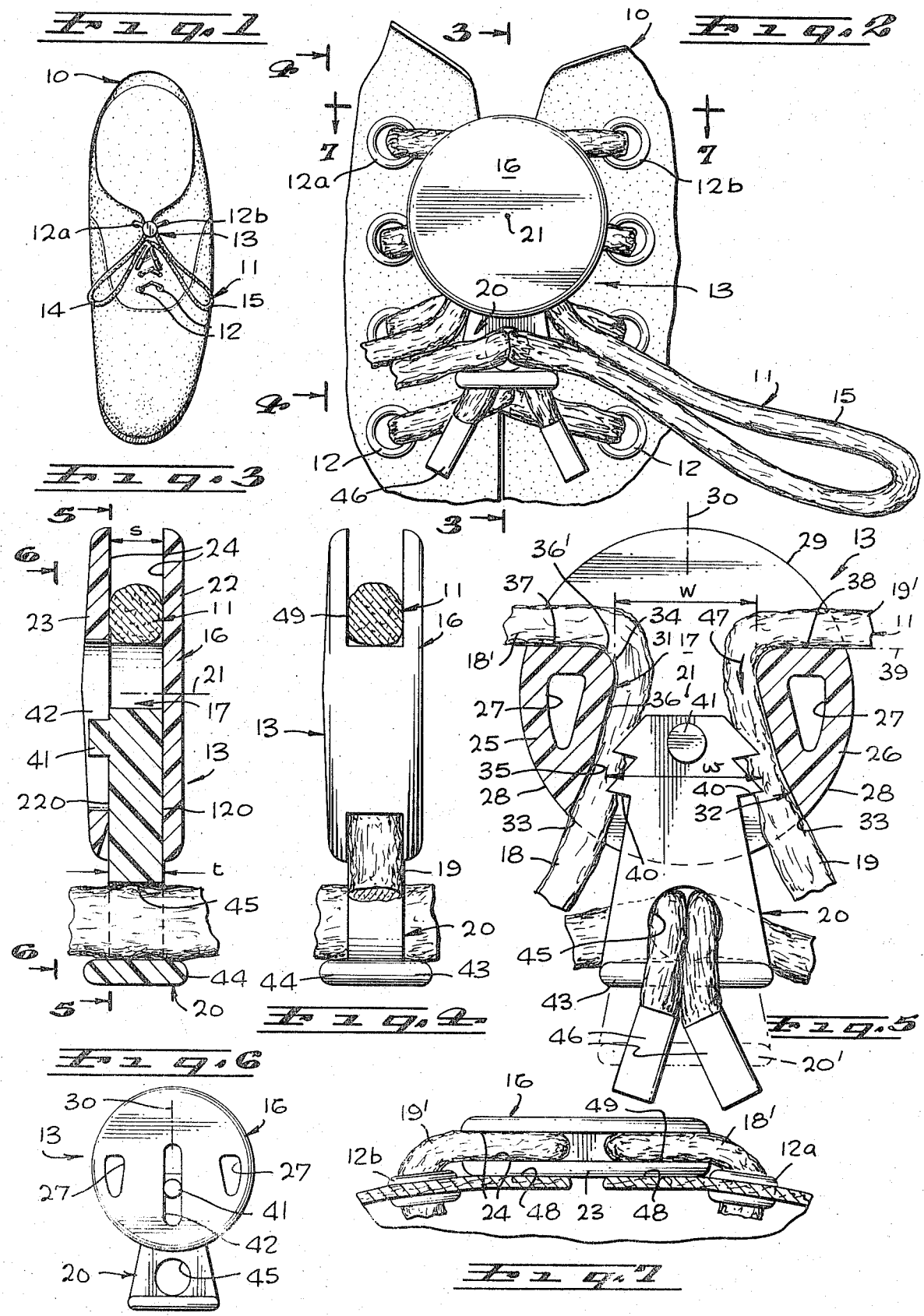

CORD LOCKING ASSEMBLY

BACKGROUND OF THE INVENTION

This invention relates generally to cord locking devices, for releasably and/or adjustably securing together two cords or cord ends, as for instance in fastening together the opposite ends of a drawstring of a garment, a bag, or the like, or in fastening together the opposite ends of a shoelace. Where this specification or the appended claims refer to "two cords," this terminology is intended to cover situations in which the two cords may be either two entirely separate elements, or the opposite ends of a single cord, string, lace, or the like.

The locking devices of the present invention are of a general type disclosed in my prior United States letters Pat. No. 3,132,390 issued May 12, 1964. More particularly, that patent shows a device including a fastener body containing a passage through which two cords extend, and carrying a relatively movable locking element which is located within the passage between the two cords. This locking element coacts with a restricted and preferably tapering portion of the body passage to lock the cord ends against movement in a predetermined direction, when the locking element has been shifted a short distance in that direction relative to the body. Displacement of the locking element in a reverse direction releases the grip on the cords and thus frees them for longitudinal movement in the passage.

SUMMARY OF THE INVENTION

Certain features of the present invention relate to the provision of a cord locking assembly of the above discussed general type in which the device which locks the two cords against relative movement also serves to hold outer ends of the cords in a unique manner causing those ends to form a pair of loops, which extend outwardly away from the locking device and then back toward the device for retention thereby. Together, the two loops may give the appearance of a bow, similar to the type of bow normally formed in tying together the opposite ends of a shoestring. The retention of the two cords in this looped or bow type configuration serves both to improve the appearance of the outer ends of the cord or string, and to keep those ends in controlled positions and prevent their dangling freely in a manner interfering with the most effective use of the garment, bag, shoe, or other item to which the cords are applied.

In the presently preferred arrangement, the cords are retained in the desired looped configuration by connection of their outer ends to the shiftable locking elements of the devices, desirably by frictional retention of those ends within an aperture or apertures in that element. Locking elements of this general type have in the past sometimes contained apertures at a somewhat similar location, but these apertures have not to my knowledge been utilized for maintaining the cords in a bowed configuration.

An additional feature of the invention relates to a manner of forming the body of the locking device to so coact with the cords that the forces applied by the cords when tightened tend to hold the device essentially flat against an adjacent structure, rather than permitting the device to project upwardly in obtrusive fashion. For this purpose, the body is constructed to pass the two strings laterally in opposite directions, through grooves or notches formed in the body in a relation such that the forces exerted by the strings against the sides of the grooves hold the device flat as desired.

BRIEF DESCRIPTION OF THE DRAWING

The above and other features and objects of the invention will be better understood from the following detailed description of the typical embodiment illustrated in the accompanying drawing in which:

FIG. 1 is a top plan view of a shoe having a lace and locking device assembly constructed in accordance with the invention;

FIG. 2 is an enlarged plan view of the FIG. 1 locking device and lace;

FIG. 3 is a further enlarged central vertical section taken on line 3—3 of FIG. 2;

FIG. 4 is an enlarged side view taken on line 4—4 of FIG. 2;

FIG. 5 is a section taken on line 5—5 of FIG. 3;

FIG. 6 is a bottom plan view taken on line 6—6 of FIG. 3; and

FIG. 7 is an enlarged vertical section taken on line 7—7 of FIG. 2.

DESCRIPTION OF THE PREFERRED EMBODIMENT

Referring first to FIG. 1, I have shown at 10 a shoe having a lace or shoestring 11 which is laced alternately through two conventional series of grommets 12 to tighten the shoe on a user's foot. At the top of the shoe, the opposite end portions of the lace extend upwardly through two final grommets 12a and 12b respectively and then pass through and are retained by a locking device 13 which tightens the lace on the shoe and also serves to hold the two end portions in a manner forming two loops 14 and 15 which together give the appearance of a bow.

The locking device includes a fastener body 16 containing and defining a passage 17 through which the two lace ends 18 and 19 extend, and a locking element 20 received movably within the body. Both of these parts 16 and 20 may be molded from an appropriate essentially rigid though perhaps slightly deformable resinous plastic material, such as polyethylene or polypropylene. In outline configuration, as viewed in FIG. 2, the body 16 may be constructed to have any of various different peripheral shapes, but preferably in the particular form of the invention illustrated in the drawing is given a circular shape about an axis designated 21 in that figure. More particularly, the body may be considered generally as including two front and rear externally circular flat walls 22 and 23 (see FIGS. 3 and 4), which are preferably parallel to one another and disposed transversly of axis 21. The spacing $s$ between the opposed parallel inner planar surfaces 24 of these walls is just sufficient to easily receive and confine lace 11 as it extends through the interior of the body.

For coacting with the mentioned parallel front and rear walls 22 and 23 in defining passage 17, the body is molded to have two spaced portions 25 and 26 (FIG. 5) which extend between and connect together the two walls 22 and 23 at opposite sides of passage 17. These portions 25 and 26 may be internally relieved from the back side of body 16, to form two recesses 27 (FIGS. 5 and 6) serving to reduce the weight of the item and the amount of material required in forming the body. At their outer sides, portions 25 and 26 have cylindrically curved edges 28 following the contour of the outer circular edges 29 of walls 22 and 23.

The passage 17 through the body may be considered as centered about an axis 30 (FIGS. 3 and 5) which extends perpendicular to and intersects the previously mentioned axis 21. This axis 30 is also parallel to and midway between the inner surface 24 of the two front and rear walls 22 and 23 of the fastener body. At the inner sides of portion 25 and 26 of the body, these portions have surfaces 31 and 32 which define opposite sides of passage 17 and which progressively converge toward one another so that the passage tapers progressively from an entrance end 33 thereof to an exit end 34. The rate of convergence may be relatively abrupt from location 33 to a location 35, and then be less abrupt at 36 between the locations 35 and 34, with the provision of rounded surfaces 36 curving away from one another at the exit end of the passage. These rounded surfaces ultimately merge into and form two laterally outwardly extending planar surfaces 37 and 38 which advance directly laterally away from one another, and preferably lie in a common plane 39 disposed parallel to axis 21 and perpendicular to axis 30. All of the surfaces 31, 32, 36, 37, and 38 of portions 25 and 26 of the body, as well as the outer surfaces 28, preferably extend perpendicular to the inner planar surfaces 24 of front and rear walls 22 and 23.

Locking part 20 is mounted within body 16 at a location between the front and rear walls 22 and 23 of the body, and laterally between the two portions 25 and 26 thereof. The thickness dimension $t$ of part 20 in the direction of axis 21 (between two parallel planar front and rear surfaces 120 and 220 of the part) is just slightly less than the previously mentioned spacing dimension $s$ between walls 22 and 23, so that part 20 is effectively confined and located between those walls but is shiftable longitudinally of axis 30 between the full line locking position of FIG. 5 and the broken line released position designated 20' in that figure. In planes disposed transversly of axis 21, the locking element 20 has the sectional configuration illustrated in FIG. 5, to form two series of locking teeth 40 at opposite sides of element 20 which may have a maximum width $w$ slightly greater than the minimum width $W$ of the most restricted portion of passage 17, or at least great enough as compared with width $W$ to enable the teeth of locking element 20 to force their way into and tightly grip the two ends of lace 11 in the FIG. 5 full line locking position of part 20, To prevent element 20 from falling out of body 16 in handling, locking element 20 may have a typically circular lug or projection 41 at its underside received within an elongated slot 42 formed in bottom wall 23 of body 16, to allow only limited movement of locking element 20 generally parallel to axis 30.

For manually releasing the locking element 20, this part has a portion 43 which projects outwardly beyond body 16 and the entrance end of passage 17. This projection 43 may have a transverse flange 44 formed at its outer end, to facilitate grasping and manipulation of part 20. Also, locking element 20 contains a preferably circular opening 45, which in both the full line locking position of FIG. 5 and the broken line released position, and therefore in all positions of element 20 so long as the two ends of the lace extend through body 16, is located entirely at the outside of the body. The two ends of the lace, just short of tips 46, extend through apertures 45, and together are a tight and close friction fit within that opening, effectively retaining the contained portions of the laces frictionally in fixed positions within the aperture 45 unless forcibly shifted therein. Tips 46 may be of the usual tubular configuration, and be rigid and have a fixed diameter or effective transverse width which is to large to permit movement of both tips through opening 45 at the same time (i.e., their effective transverse dimensions should be greater than one-half the diameter of opening 45). Thus, in order to separate the laces from element 20, tips 46 must be forced through the opening 45 one at a time, thereby minimizing the chance of unintentional detachment of the lace ends from element 20.

To now describe the manner of use of the device, assume that the lace has been applied to the shoe as shown, and that the two ends of the lace have been passed through passage 17 at opposite sides of locking element 20, and that the extremities of the two ends have been forced into aperture 45 to the condition illustrated in the figures. In order to loosen the lace for application of the shoe to a user's foot, the user may pull locking element 20 to its broken line retracted position of FIG. 5, in which the spacing between teeth 40 and the opposite sides of passage 17 is great enough to allow adjusting movement of the two halves of the lace longitudinally through passage 17 and toward the restricted end 34 of that passage. This permits the lace to be loosened as much as desired, while the extremities of the lace still remain within aperture 45, but with loops 14 and 15 reducing in size as a result of the loosening of the lace on the shoe. After the foot has been inserted into the shoe, the user tightens the laces in generally conventional manner, pulling on the two ends just beyond top grommets 12a and 12b, and then slides body 16 along the lace ends and toward these grommets. He may then press inwardly on locking element 20, to actuate it to the full line position of FIG. 5 in which it prevents releasing movement of the lace ends in the direction of the exit end 34 of passage 17 in FIG. 5 to thereby hold the lace tight on the shoe in the condition of FIGS. 1 and 2.

As discussed previously, the two loops 14 and 15 together give the appearance of a bow. Each of the loops is retained at a first end by clamped retention between element 20 and a side wall of passage 17, and is retained at its second end within aperture 45.

Because of the manner in which the two strings 18 and 19 extend laterally outwardly in opposite directions while still confined between walls 22 and 23 of the body (see FIGS. 4, 5, and 7) the tightened strings automatically serve a second highly important function in holding the flat disc-like body 16 essentially parallel to and flat against the upper surface 48 of the shoe structure, as seen best in FIGS. 4 and 7. This effect is achieved because the two string portions 18 and 19, as they extend in opposite directions laterally away from one another (at 18' and 19' in FIGS. 5 and 7) and then are pulled downwardly into grommets 12a and 12b laterally beyond body 16 (FIG. 7), are caused to bear downwardly against surface 24 of rear wall 23 of the body, at 49, to press wall 23 against the shoe structure surface 48 and hold it there by the force of the tightened lace. Similarly, the body 16 could be inverted with the string bearing against the inner wall 24 of the front wall 22 of the device, if desired.

While a certin specific embodiment of the present invention has been disclosed as typical, the invention is of course not limited to this particular form, but rather is applicable broadly to all such variations as fall within the scope of the appended claims.

I claim:

1. A cord fastener comprising a body containing a passage through which a pair of cords are to extend and having a first end facing in a first direction and a second end facing in a second essentially opposite direction, said passage having two opposite side walls forming a locking restriction, a relatively movable locking unit received at least partially within said passage and adapted to be received between said cords and to clamp them outwardly against said opposite side walls of said passage in a relation locking said cords against longitudinal movement in said first direction, said body being constructed to pass said two cords laterally from said first end of said passage in two opposite lateral directions respectively, said body having surfaces facing generally in said first direction for engaging said cords respectively as they extend laterally from said first end of the passage to take forces exerted longitudinally on said cords, said body having shoulders which are also positioned to engage said cords as they extend laterally from said first end of said passage and which project in said first direction beyond said last mentioned surfaces and at locations to be pressed by said cords toward an adjacent structure and thereby hold said body essentially flat thereagainst.

2. A cord fastener as recited in claim 1, in which said body has at each side thereof two of said shoulders disposed generally parallel to one another and both projecting in said first direction beyond a corresponding one of said surfaces in a relation forming with said one surface a groove facing in said first direction and through which the associated cord extends laterally.

3. A cord fastener as recited in claim 2, in which said shoulders and said grooves continue laterally to the opposite sides of the body.

4. The combination comprising a shoe, a lace applied to the shoe and having two end portions; a locking device including a body containing a passage through which said end portions of the lace extend, said passage having two opposite side walls forming a locking restriction, and a locking unit received at least partially in said passage between said two end portions of the lace and relatively movable between a locking position clamping said end portions of the lace against said opposite side walls of the passage and locking said end portions against movement toward a first end of said passage and a released position permitting such movement; said end portions of the lace extending outwardly beyond a second end of the passage and forming respectively two loops which extend first outwardly away from said device and then back toward the device; said lace being retained at first ends of said loops by said clamped retention of the lace between said unit and said body; and means carried by said device holding said lace at second ends of the loops to maintain the looped configuration, said locking unit having a projection extending beyond said body at said second end of said passage, said lace holding means including an aperture formed in said projection and within which opposite ends of said lace are frictionally retained in essentially fixed positions.

5. The combination comprising a fastener body containing a passage, said passage having two opposite side walls forming a restricted locking portion of the passage; two cords extending through said passage; a locking unit located at least partially within said passage between said cords and movable between a locking position in which it clamps said cords tightly against opposite side walls of the passage and locks said cards against longitudinal movement toward a predetermined first end of said passage and a released position permitting such movement; said cords having portions extending out of a second end of the passage to the outside of the body and forming respectively two loops which first extend outwardly away from the body and then back toward the body; said cords being retained at first ends of said loops by said clamped retention of the cords between said unit and said body; and means holding said cords at second ends of the loops in a relation maintaining the looped configuration, said locking unit having a projection extending beyond said second end of said passage, said card holding means including aperture means formed in said projection of the locking unit and through which said cords extend at said second ends of said loops and within which said cords fit tightly in a relation retaining said cords in fixed positions therein.

6. The combination comprising a fastener body containing a passage having first and second ends and a restricted locking portion; two cords extending through said passage; a locking unit located at least partially within said passage and movable relative to said body between a locking position in which it grips said cords tightly and locks them against longitudinal movement toward said first end of said passage and a released position permitting such movement; said cords having portions extending out of said second end of the passage to the outside of the body and forming respectively two loops which first extend outwardly away from the locking unit and then back toward the locking unit; said cords being retained at first ends of said loops by said gripped engagement with said unit; and means carried by said locking unit for movement therewith relative to said body and holding said cords at second ends of the loops in a relation maintaining the looped configuration.

7. The combination as recited in claim 6, in which said cord holding means include means forming an aperture in said locking unit through which at least one of said cords extends at said second end of the corresponding loop in a tightly fitting relation frictionally retaining it in fixed position in the aperture.

8. The combination as recited in claim 6, in which said locking unit has a projection extending beyond said second end of said passage and carrying said cord holding means.

9. The combination comprising a shoe a lace applied to the shoe and having two end portions; a locking device including a body containing a passage through which said end portions of the lace extend, said passage having two opposite side walls forming a locking restriction, and a locking unit received at least partially in said passage between said two end portions of the lace and movable relative to said body between a locking position clamping said end portions of the lace against opposite side walls of the passage and locking said end portions against movement toward a first end of said passage and a released position permitting such movement; said end portions of the lace extending outwardly beyond a second end of the passage and forming respectively two loops which extend first outwardly away from said device and then back toward the device; said lace being retained at first ends of said loops by said clamped retention of the lace between said unit and said body; and means carried by said locking unit for movement therewith relative to said body and holding said lace at second ends of the loops to maintain the looped configuration.

* * * * *